July 6, 1948.   H. G. BUSIGNIES   2,444,426
REPEATER CONTROL SYSTEM
Filed Oct. 26, 1943

INVENTOR.
HENRI G. BUSIGNIES
BY
ATTORNEY

Patented July 6, 1948

2,444,426

UNITED STATES PATENT OFFICE 2,444,426

REPEATER CONTROL SYSTEM

Henri G. Busignies, Forest Hills, N. Y., assignor to Federal Telephone and Radio Corporation, New York, N. Y., a corporation of Delaware Application October 26, 1943, Serial No. 507,704

5 Claims. (Cl. 250—15)

1

This invention relates to radio control devices and more particularly to those devices adapted to be triggered into operation by a given radio signal.

In the copending application of Edmond M. Deloraine, for "Radio locating systems," Serial No. 507,664, filed of even date, a system is disclosed which includes a radio locating device and a plurality of location repeaters. The location repeaters are adapted to be positioned at points the location of which with respect to the locating device is to be determined when desired within in either a few hours or a few days at most from the time of their positioning. Each repeater is provided with means triggerable only by a given signal, intended to be transmitted by the radio locating device, and means to transmit a return signal of a given characteristic identifying the repeater. The radio locating device is provided with means to detect the repeater signal, to determine the identity of the repeater transmitting same and also the direction and distance to such repeater.

It is an object of this invention to provide a power control arrangement for such location repeaters as above referred to so as to prolong considerably the useful period thereof without adding materially to the size and weight of the repeater as would be the case where additional batteries are provided.

Figure 1:
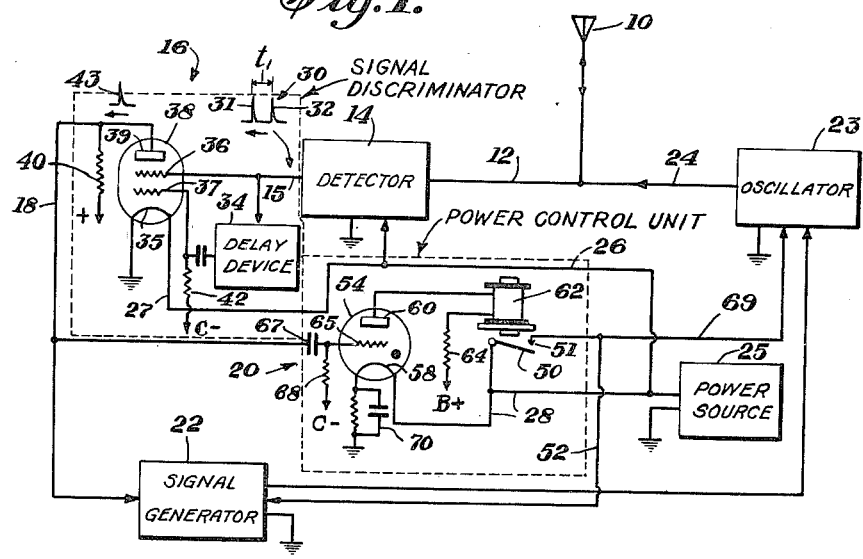
Figure 2:
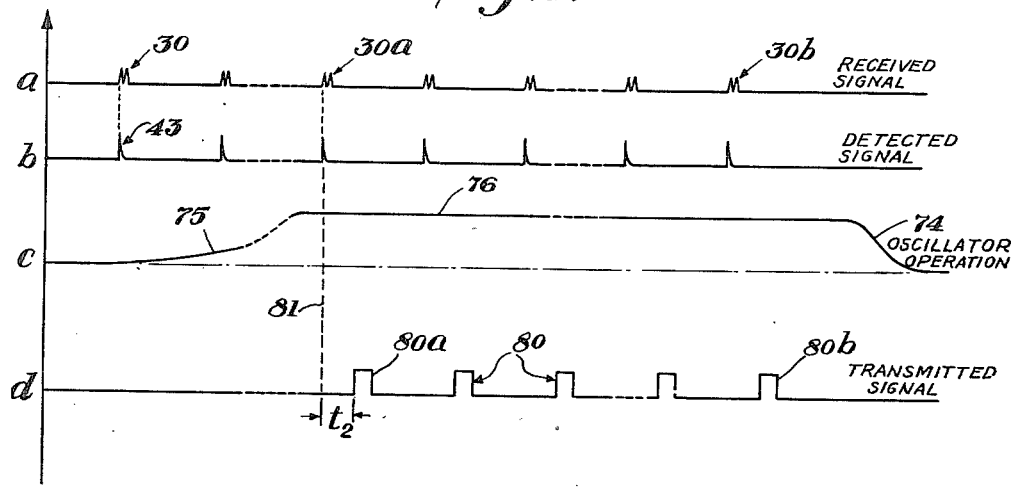

The above and other objects of the invention will become more apparent upon reference to the following detailed description to be read in connection with the accompanying drawing, in which:

Fig. 1 is a schematic block diagram of a location repeater according to the principles of this invention; and Fig. 2 is a graphical illustration useful in explaining the operation of the repeater.

The location repeater shown in Fig. 1 is constructed to form a small compact unit and since the system operates preferably at ultra high frequencies, it is provided with a relatively small antenna 10. The antenna is used both for receiving the triggering signals and for transmitting the signals identifying the repeater. The antenna 10 is connected by line 12 to receiver means including the usual detector 14. Connected to the output 15 of the detector 14 is a signal discriminator 16 the output 18 of which is connected to a power control unit 20 and a signal generator 22.

The signal generator 22 may be of any known form adapted to produce in response to a triggering impulse a signal having a given characteristic which may be used for identifying the repeater. In the aforementioned copending Deloraine application, several forms of signal generators are disclosed any one of which is appropriate. For purposes of illustration, however, I have indicated by curve $d$ of Fig. 2 a square pulse signal which may be produced by the known "flip-flop" type of multivibrator wherein the multivibrator is adapted to return from a second state of operation to its normal state of operation in a given period of time each time it is triggered from the normal state of operation to said second state of operation. By adjusting the time constants of the multivibrator circuit, it is possible to produce a pulse of a predetermined width useful as the identifying signal for the repeater.

The output of the signal generator 22 is applied to an oscillator 23 whereby the signals produced by the generator operate as modulating energy for the oscillator in a manner well known. The output 24 of the oscillator 23 is connected to the antenna 10. Since the output signal of the oscillator 23 is preferably different in frequency or form from the triggering signal, no blocking circuit between the oscillator and detector need be provided.

The repeater receives its main power supply from source 25 which preferably consists of a battery of the necessary voltage. This source is continually connected by lines 26, 27 and 28 to energize the detector 14, the signal discriminator 16 and the power control unit 20. The supply of power to generator 22 and the oscillator 23 is controlled by unit 20, as will be described in detail hereinafter.

It may be assumed that the location repeater of Fig. 1 is arranged to be triggered by a triggering signal 30 made up of two pulses 31 and 32 separated by a given time interval $t_1$. Upon detection of the triggering signal 30, the pulses of the signal are applied to the discriminator 16 which comprises a parallel circuit one branch of which includes a delay device 34, the two branches terminating at separate grids 36 and 37 in a vacuum tube 38. The plate electrode 39 is connected to the line 18 and to a source of positive current through resistor 40. The cathode 35 is heated by power supplied over lines 26 and 27 from source 25. The grid 37 is biased negatively by a negative source of potential through a resistor 42 whereby the tube 38 is normally biased to cut-off and is non-responsive to the input energy of a single pulse.

The delay device 34 is of such retardation characteristics as to retard the pulse energy applied thereto by a time interval equal to the interval $t_1$. Thus, the retardation applied to pulse 31 of the signal 30 in passing through the delay device 34 will cause pulse 31 to reach the grid 37 at the same time pulse 32 reaches the grid 36. This coincidence of the energy of pulses 31 and 32 overcomes the negative bias on the tube sufficient to produce a single output pulse 43. Other combinations of pulses having larger or smaller intervals therebetween than interval $t_1$ will not operate the tube 38 since the pulse energy will not occur in coincidence on the grids 36 and 37.

Assuming that the tube 38 has been triggered by a signal 30 thereby producing pulse energy 43, it will be observed that the latter will be applied to the power control unit 20 and to the signal generator 22. The signal generator 22, however, will not respond to the pulse energy 43 since the power supply to the generator is controlled by relay contacts 50, 51 which connect the source 25 to the generator through lines 28 and 52. The power control unit 20, however, will be triggered since the cathode 58 of the gas-filled tube 54 thereof is supplied with power from the source 25 over line 28. The plate 60 of the tube 54 is connected through relay coil 62 to a source of positive current through resistor 64. The grid 65 is connected through a coupling condenser 67 to the line 18 and is also supplied with a negative bias through resistor 68.

The supply of power to the oscillator 23 is also controlled by relay contacts 50, 51, the oscillator being connected to contact 51 through line 69.

The operation of the location repeater will best be understood by reference to Fig. 2. Curve $a$ represents a series of triggering signals 30 transmitted for the purpose of locating the repeater. When these pulses are detected at 14 and applied to the signal discriminator 16, corresponding pulses 43 (curve $b$) are produced one for each of the triggering signals 30. The pulses 43 are applied in succession on the grid 65 of the tube 54. The tube 54 will fire in response to each pulse 43 and due to the time constant of the self biasing resistance-capacity circuit 70 will continue to fire for a period sufficient to actuate the relay elements 62, 50. The relay coil 62 is preferably of the slow release type so that when once closed it will remain closed as long as signal pulses 30 are received, the repetition frequency of the signals 30 being such as to cause the tube 54 to fire shortly before the relay coil 62 would normally release the contact 50.

When the pulse energy 43 of curve $b$ is first applied to the tube 54 thereby causing closure of the relay contacts 50, 51, power from the source 25 is applied through line 28, contacts 50, 51 and line 52 to the signal generator 22, and from contact 51 through line 69 to the oscillator 23.

Due to the interval required to heat up the filaments of the vacuum tubes contained in the generator 22 and the oscillator 23, there will be a lapse of time before the repeater will transmit an identifying signal. This heating up period is indicated by the portion 75 of the curve $c$. The portion 76 of the curve $c$ represents the interval during which the generator 22 and the oscillator 23 are heated satisfactorily for operation. As soon as this heated condition is reached, the generator 22 and the oscillator 23 will operate to transmit a characteristic pulse signal 80 in response to each of the succeeding triggering signals such as indicated at 80$a$ for signal 30$a$. As shown by broken line 81, there will be a time interval $t_2$ between the reception of signal 30$a$ and the transmission of repeater pulse 80$a$. This time period, of course, will depend on the operation of the discriminator 16 and the time required for generation and transmission of the repeater signal.

This repeating function of the repeater will continue until the signals 30 are discontinued as indicated at 30$b$. Thus, the last repeater signal will be the pulse 80$b$ corresponding to the last signal pulse 30$b$. The power supply 25 will be discontinued to the generator and oscillator a short interval after the discontinuance of triggering signals thereby permitting the filaments of the tubes of the generator and oscillator to cool as indicated by the portion 74 of the curve $c$.

It will be apparent from the foregoing description, that the power control feature of the invention prolongs the energy of a given power supply for a much longer period than if the power supply were connected directly to the filaments of all parts of the repeater.

While I have shown specific apparatus for performing the power control function of my invention, it will be understood by those skilled in the art that many other arrangements may be made whereby the power supply is controlled in response to a given triggering signal. For example, instead of using a slow release relay, the gas-filled tube 54 may be arranged to fire for periods longer than the intervals between successive triggering signals. Switching means other than the relay and gas-filled tube arrangement shown may, of course, be used, so long as they provide the requisite timing for the power supply, without departing from the invention. It is to be understood, therefore, that the apparatus herein illustrated and described is to be regarded as illustrative of the invention only and not as limiting the scope of the object.

I claim:

1. In a location repeater of the character having transmitting means including a signal generator to produce for transmission pulse signals of a given character identifying said repeater and receiving means responsive only to pulse signals of a given repetition rate to cause flow of energy for controlling operation of said signal generator; a power supply, means connecting said power supply to said receiver means to energize the same continuously for normal response to said given repetition rate pulse signals, relay means energizable to connect said power supply to said transmitting means, and control means comprising an electron discharge device responsive to said flow of energy at said given repetition rate to energize said relay means.

2. The repeater defined in claim 1 wherein the transmitting means includes an oscillator coupled to said signal generator for modulation by the pulse output thereof, and said relay means includes contact means for controlling the supply of power to both said oscillator and said signal generator.

3. In a location repeater of the character having transmitting means including a signal generator to produce for transmission a signal of a given character identifying said repeater and receiving means responsive only to pulse signals of a given repetition rate to produce a synchronizing pulse in response to each pulse signal of a given repetition rate for controlling operation of said signal generator; a power supply, means connecting said power supply to said receiver means to energize the same continuously for normal response to said given repetition rate pulse signals, coupling means comprising an electron discharge device operable between coupling and non-coupling conditions for controlling flow of energy from said power supply to said transmitting means, and means responsive to the occurrence of a train of synchronizing pulses from said receiving means to actuate said coupling means from non-coupling condition to coupling condition and means responsive to the failure of occurrence of said pulse signals at said given repetition rate to effect return of said coupling means to non-coupling condition.

4. In a location repeater of the character having transmitting means including a signal generator to produce for transmission a signal of a given character identifying said repeater and receiving means responsive only to given triggering signals to cause flow of energy for controlling operation of said signal generator; a power supply, means connecting said power supply to said receiver means to energize the same continuously for normal response to said given triggering signals, relay means energizable to connect said power supply to said transmitting means, and control means responsive to said flow of energy to energize said relay means, said control means including a gas-filled tube having plate and cathode electrodes thereof connected in circuit with said relay and the grid electrode thereof connected to the output of said receiver means, whereby said flow of energy causes said tube to fire and means for biasing said tube to prolong the firing thereof for a given period sufficient to operate said relay means.

5. A location repeater of the character having an oscillator, a signal generator for producing a signal of a given characteristic identifying said repeater, means for applying the repeater signals thus produced to said oscillator to modulate the output thereof, receiver means for detecting pulse signals, and a signal discriminator responsive to detection of pulses of a given repetition rate, a power supply, control means comprising an electron discharge device responsive to said discriminator for controlling at said given repetition rate the application of power from said power supply to said oscillator and to said generator, and means for connecting said power supply to said receiver means, said discriminator and said control means to maintain the receiver, discriminator and control means continuously in energized condition preparatory to detection of pulse signals.

HENRI G. BUSIGNIES.

REFERENCES CITED

The following references are of record in the file of this patent:

UNITED STATES PATENTS

| Number | Name | Date |
| --- | --- | --- |
| 1,702,423 | Wensley | Feb. 19, 1929 |
| 1,947,018 | Plastino | Feb. 13, 1934 |
| 2,047,531 | Ardenne | July 14, 1936 |
| 2,152,329 | Schussler | Mar. 28, 1939 |
| 2,165,063 | MacKay | July 4, 1939 |
| 2,211,942 | White | Aug. 20, 1940 |
| 2,223,049 | Reichle | Nov. 26, 1940 |
| 2,266,401 | Reeves | Dec. 16, 1941 |
| 2,287,044 | Kroger | June 23, 1942 |

FOREIGN PATENTS

| Number | Country | Date |
| --- | --- | --- |
| 337,469 | Great Britain | Nov. 3, 1930 |